United States Patent
Brosio et al.

(10) Patent No.: US 8,522,748 B2
(45) Date of Patent: Sep. 3, 2013

(54) METHOD FOR DIAGNOSING THE INTEGRITY OF A SWIRL GENERATING SYSTEM FOR AN INTERNAL COMBUSTION ENGINE

(75) Inventors: Fulvio Brosio, Turin (IT); Nando Vennettilli, Turin (IT); Domenico Rampone, Asti (IT)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 12/880,718

(22) Filed: Sep. 13, 2010
(Under 37 CFR 1.47)

(65) Prior Publication Data
US 2012/0006296 A1    Jan. 12, 2012

(30) Foreign Application Priority Data

Sep. 14, 2009 (GB) .................................. 0916054.0

(51) Int. Cl.
*F02B 31/00* (2006.01)
(52) U.S. Cl.
USPC ........................................................ 123/306
(58) Field of Classification Search
USPC .................. 123/262.306, 307, 361, 399, 402,
123/403, 436
See application file for complete search history.

(56) References Cited

U.S. PATENT DOCUMENTS

| | | | | |
|---|---|---|---|---|
| 5,231,964 A | * | 8/1993 | Harada | 123/306 |
| 5,267,543 A | * | 12/1993 | Novak et al. | 123/306 |
| 5,752,485 A | * | 5/1998 | Minowa et al. | 123/399 |
| 5,947,097 A | * | 9/1999 | Harada | 123/674 |
| 5,950,595 A | | 9/1999 | Yoshioka et al. | |
| 5,979,404 A | * | 11/1999 | Minowa et al. | 123/399 |
| 2003/0000506 A1 | * | 1/2003 | Brosseau et al. | 123/568.18 |

(Continued)

FOREIGN PATENT DOCUMENTS

EP    1936152 A2    6/2008

OTHER PUBLICATIONS

Search Report, dated Dec. 16, 2009, for Great Britain Application No. 0916054.0.

*Primary Examiner* — John Kwon
*Assistant Examiner* — Johnny Hoang
(74) *Attorney, Agent, or Firm* — Ingrassia Fisher & Lorenz, P.C.

(57) ABSTRACT

A method is provided for diagnosing the integrity of a swirl generating system for an internal combustion engine. The swirl generating system includes, but is not limited to swirl controlling elements that are individually located in a respective air passage connecting the intake manifold of the engine to an intake port of an engine combustion chamber, an actuator having a movable shaft, a cinematic chain for mechanically connecting the swirl controlling elements to the actuator movable shaft, an actuator control unit for normally moving the actuator movable shaft in a first direction towards a first final position, and in a second opposite direction towards a second final position, and actuator sensor for sensing the position of the actuator movable shaft. The method providing to arrange at least a mechanical stop for directly acting on one component of the cinematic chain, in order to indirectly limit the movement of the actuator movable shaft in the first direction at a first checking position coincident or beyond the first final position, command the actuator control unit for moving the actuator movable shaft in the first direction towards the first checking position, and verify through the position sensing means whether the actuator movable shaft stops in the first checking position (CP1) or goes beyond.

13 Claims, 5 Drawing Sheets

(56) References Cited

U.S. PATENT DOCUMENTS

| | | | |
|---|---|---|---|
| 2006/0081208 A1* | 4/2006 | Sturdy et al. | 123/184.55 |
| 2009/0096404 A1* | 4/2009 | Grossmann et al. | 318/538 |
| 2009/0241889 A1* | 10/2009 | Nakawatase | 123/184.56 |
| 2010/0006053 A1* | 1/2010 | Kondo | 123/184.56 |
| 2010/0018496 A1* | 1/2010 | Fornara et al. | 123/306 |

* cited by examiner

METHOD FOR DIAGNOSING THE INTEGRITY OF A SWIRL GENERATING SYSTEM FOR AN INTERNAL COMBUSTION ENGINE

CROSS-REFERENCE TO RELATED APPLICATION

This application claims priority to British Patent Application No. 0916054.0, filed Sep. 14, 2009, which is incorporated herein by reference in its entirety.

TECHNICAL FIELD

The present invention relates to internal combustion engines, especially of Diesel type, which are equipped with an air induction system arranged for generating swirl in the combustion chambers of the engine.

BACKGROUND

In the field of internal combustion engines, it is known that turbulence may improve the preparation of the air-fuel mixture in the combustion chamber and the combustion thereon, to thereby improving the performance of the engine. Conventional air induction system generally provides each combustion chamber of the engine with at least a straight inlet port, which is formed for minimizing the resistance to the intake airflow, and thereby increasing the volumetric efficiency.

When the engine is operating at high load, although the flow resistance of the inlet port is low, sufficient turbulence is caused in the combustion chamber for keeping the air-fuel mixing and combustion at acceptable level. On the contrary, when the engine is operating at low and medium load, the low flow resistance of the inlet port and the low velocity of the intake airflow are not generally sufficient to generate adequate turbulence in the combustion chamber.

In order to improve turbulence, have been proposed air induction systems which provide each combustion chamber of the engine not only with a straight inlet port, but also with a further swirl inlet port specifically designed for imparting swirling motion to the intake airflow. A swirl inlet port of this kind is the so called helical port, which extends helically around the axis of the intake valve seating surface. Such air induction systems further comprises a swirl controlling element for each combustion chamber of the engine, typically in form of a rotating flap.

This swirl controlling flap is located in a passageway connecting the intake manifold to the straight inlet port of the combustion chamber, for selectively close said passageway in accordance with engine load conditions. When the engine is operating at low or medium load, the swirl controlling flap is kept in closed position for preventing the intake air to flow through the straight inlet port. Therefore, the major portion of the intake air flows into the combustion chamber through the swirl inlet port, achieving a strong turbulence.

When the engine is operating at high load, the swirl controlling flap is kept in open position for allowing intake air to flow into the cylinder through the straight port. The major portion of the intake air flows into the combustion chamber through the straight inlet port, due to the less flow resistance of the latter relative to the swirl inlet port, to thereby reducing pressure drop and achieving a high volumetric efficiency.

All swirl controlling flaps are simultaneously rotate between their open and closed position by means of a common electromechanical actuator. The electromechanical actuator generally comprises a movable shaft which is called actuator shaft. The electromechanical actuator can be of the rotational or linear kind, such that the actuator shaft is a rotating shaft or a reciprocating shaft respectively.

The actuator shaft is mechanically coupled with the swirl controlling flaps by means of a proper cinematic chain, which shall comprise gears or levers. The cinematic chain is provided for transforming any rotation or linear movement of the actuator shaft to a correspondent rotation of the swirl controlling flaps.

The electromechanical actuator further comprises an embedded position sensor for real time sensing the angular or linear position of the actuator shaft. The electromechanical actuator is controlled by an engine control unit, on the base of the signal from the position sensor and the engine operating condition.

Alternatively, the electromechanical actuator can be provided with an embedded microprocessor based controlled, which control the rotations of the actuator shaft on the base of the signal from the position sensor, and which is connected to the engine control unit, for receiving from the latter instructions about the positions to reach in response of engine operating conditions. As a matter of fact, the engine control unit detects the position of the actuator shaft and the operating condition of the engine, and when the engine is operating at low or medium load, commands the electromechanical actuator to rotate the swirl controlling flaps in closed position, and when the engine is operated at high load, commands the electromechanical actuator to rotate the swirl controlling flaps in open position. Therefore, during normal operation, the actuator shaft is commanded for moving in both directions between a first and a second final position, which respectively correspond to open and closed position of the swirl controlling flaps.

At least one aim is to detect the integrity of the cinematic chain connecting the actuator movable shaft to the swirl controlling valves. Another aim of the present invention is to meet the goal with a rather simple, rational and inexpensive solution. In addition, other aims, desirable features and characteristics will become apparent from the subsequent summary and detailed description, and the appended claims, taken in conjunction with the accompanying drawings and this background.

SUMMARY

The invention provides a method for diagnosing the integrity of a swirl generating system for an internal combustion engine, wherein the swirl generating system comprises: a plurality of swirl controlling elements which are individually located in a respective air passage connecting the intake manifold of the engine to an intake port of an engine combustion chamber, an actuator having a movable shaft, a cinematic chain for mechanically connecting the swirl controlling elements to the actuator movable shaft, actuator controlling means for normally moving the actuator movable shaft in a first direction towards a first final position, and in a second opposite direction towards a second final position, and actuator sensing means for sensing the position of the actuator movable shaft.

The diagnostic method according to the invention provides to arrange at least a mechanical stop for directly acting on one component of the cinematic chain, in order to indirectly limit the movement of the actuator movable shaft in the first direction at a first checking position, which is coincident or beyond the first final position, command the actuator controlling means for moving the actuator movable shaft in the first direction towards said first checking position, and verify through the position sensing means of the actuator, whether the actuator movable shaft stops in the first checking position or goes beyond. If the actuator movable shaft stops in the first checking position defined by the mechanical stop, than the cinematic chain connecting the actuator movable shaft to the swirl controlling elements is integral and properly working. On the contrary, if the actuator movable shaft goes beyond the first checking position defined by the mechanical stop, than the cinematic chain is broken and a failure signal can be produced by the engine control system.

For a better diagnosis, the method according to the invention preferably further provides to arrange at least a second mechanical stop for directly acting on one component of the cinematic chain, in order to indirectly limit the movement of the actuator movable shaft in the second direction at a second checking position, which is coincident or beyond the second final position, command the actuator controlling means for moving the actuator movable shaft in the second direction towards the second checking position, and verify through the position sensing means of the actuator, whether the actuator movable shaft stops in said second checking position or goes beyond. Using the position sensor embedded in the actuator, the method according to the invention can perform the integrity diagnosis of the cinematic chain without the installation of any other position sensor, thereby reducing the system costs and simplifying the system design.

The diagnostic method can be performed by the engine control unit (ECU) after each engine switching off, or cyclically after a predetermined number of kilometers traveled by the vehicle on which the engine is installed.

An internal combustion engine is also provided that is specially arranged for carrying out the diagnostic method. Further objects, features and advantages of the present invention will be apparent from the detailed description of preferred embodiments that follows, when considered together with the accompanying drawings.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
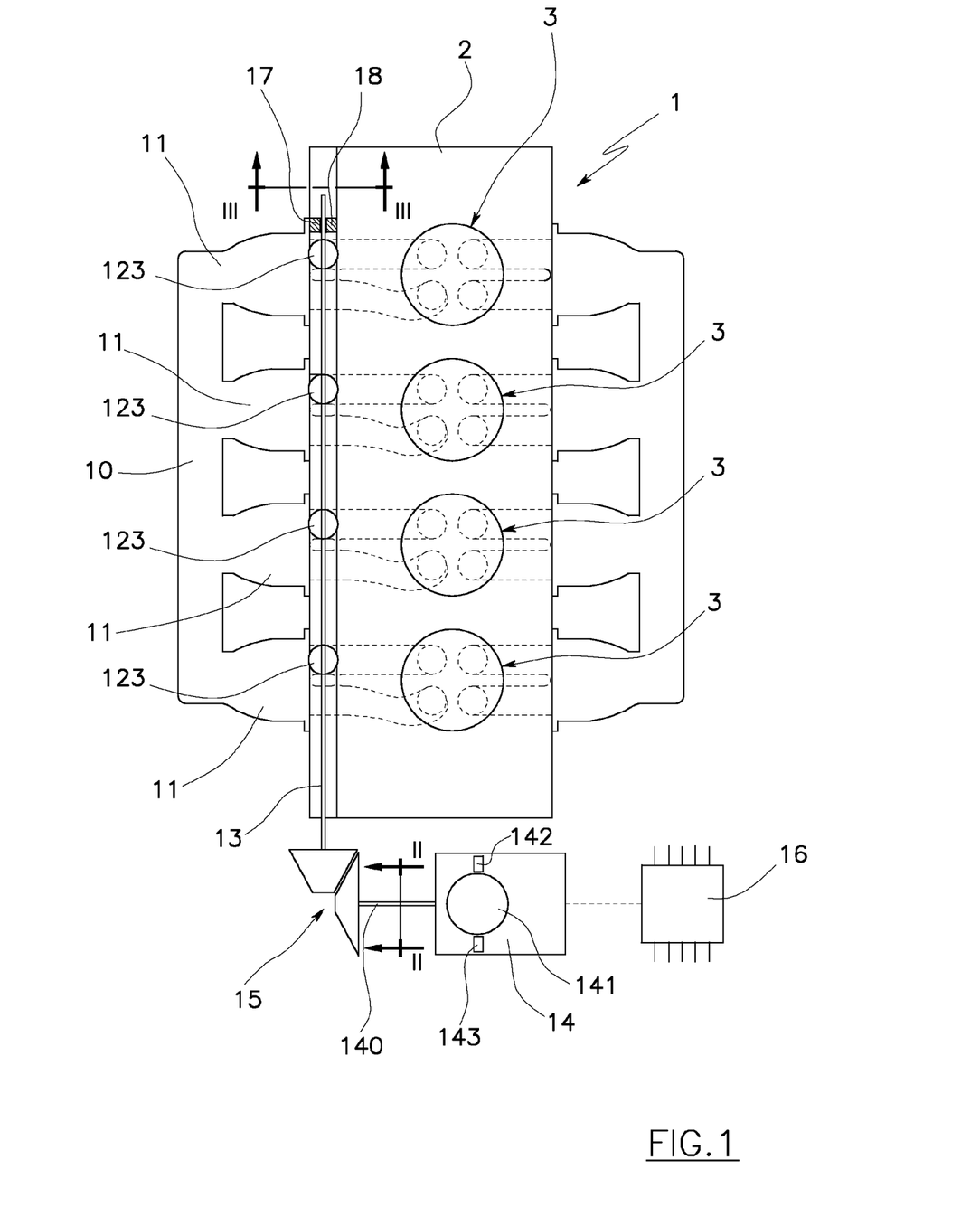
FIG. 1 is a schematic view of a single bank engine equipped with an air induction system according to an embodiment of the present invention.

FIG. 1 schematically illustrates a single bank Diesel engine 1 (for example an inline engine). As a matter of fact, the engine 1 comprises a single cylinder bank 2 having a plurality of cylinder bores 3 whose axis are aligned in a common plane.

Figure 5:
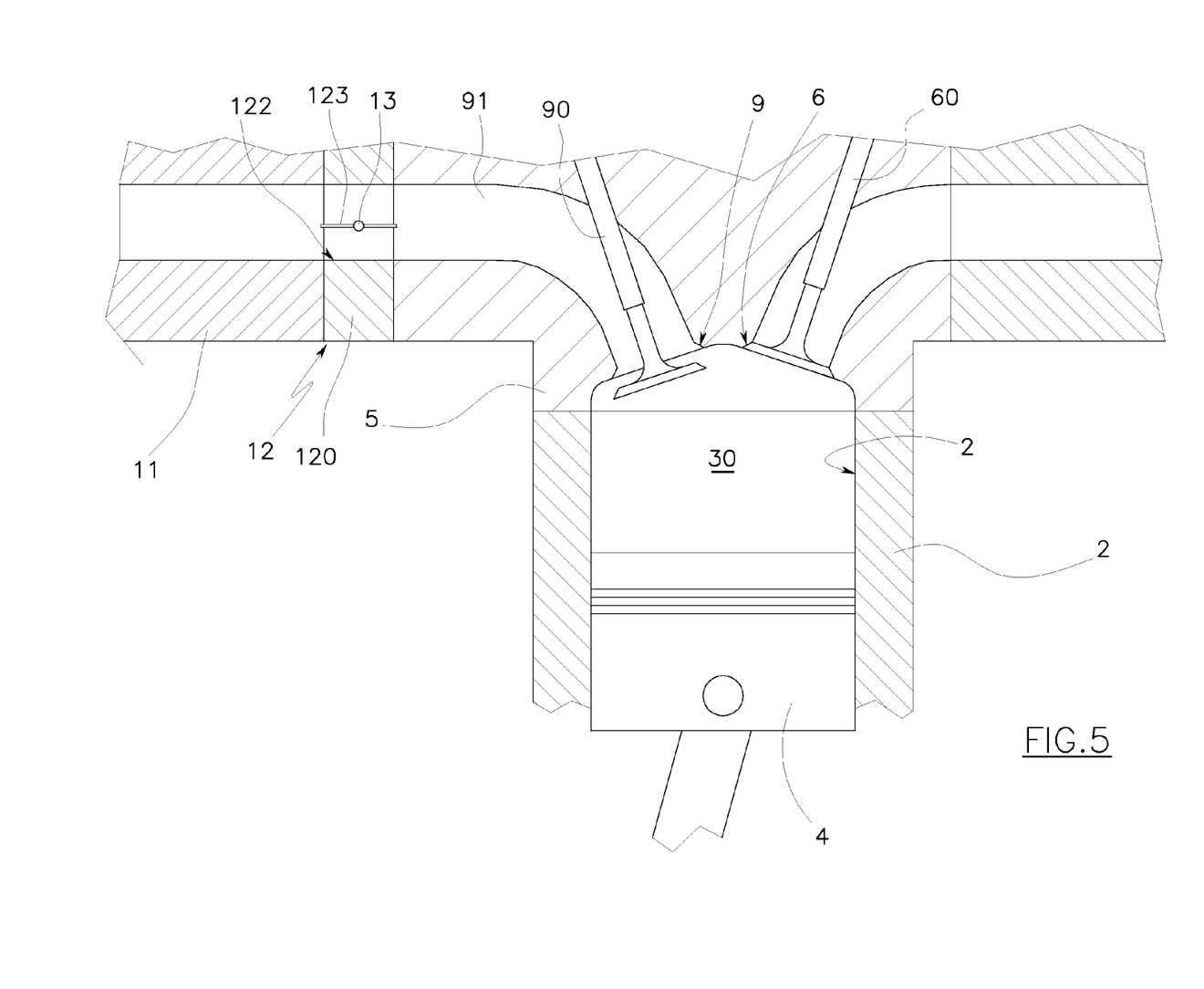
FIG. 5 is section V-V of FIG. 3.

As shown in FIG. 5, each cylinder bore 3 is provided with a respective reciprocating piston 4.

A cylinder head 5 closes the top of each cylinder bores 3, defining a combustion chamber 30 above the piston 4. For each cylinder bore 3, the cylinder head 5 comprises two exhaust ports 6 and 7, and two inlet ports 8 and 9, which are defined by four openings in the upper surface of the combustion chamber 30 (see FIG. 4).

Figure 4:
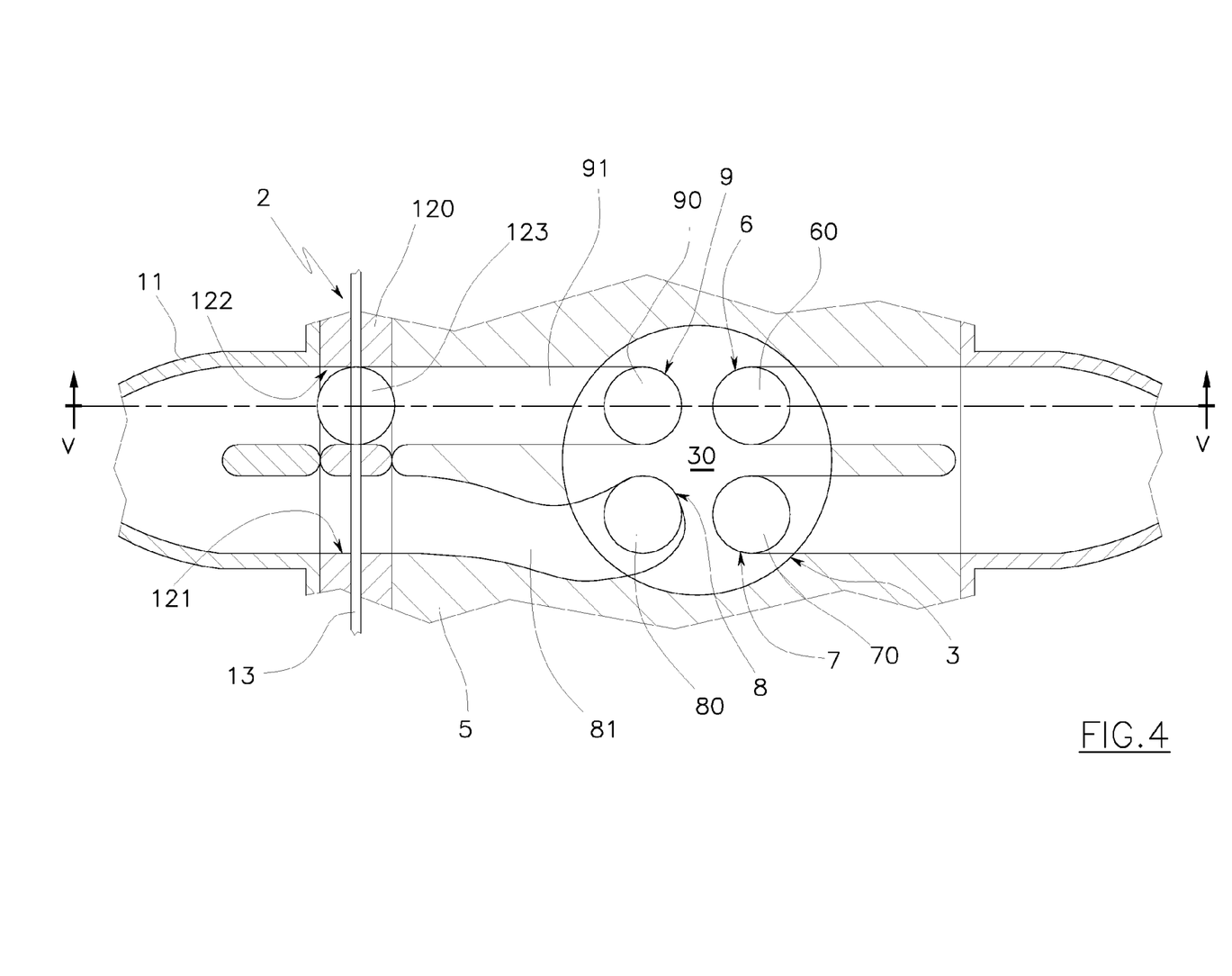
FIG. 4 is a detail of FIG. 1 which shows a single cylinder.

The exhaust ports 6 and 7 are opened and closed by means of a respective exhaust valve 60 and 70, and similar to that the inlet ports 8 and 9 are opened and closed by means of a respective inlet valve 80 and 90. The inlet and exhaust valves are opened and closed by means of a well known driving apparatus. The first inlet port 8 is constructed as a helical type inlet port, which is suitable for imparting a swirling motion to the air flowing there through, to thereby generating turbulence into the combustion chamber 30. The second inlet port 9 is constructed as convention straight type inlet port, which has a low flow resistance for reducing air pressure drop.

Two separate inlet passages 81 and 91 are formed in the cylinder head 5. The inlet passages 81 and 91 communicate with the first inlet port 8 and the second inlet port 9 respectively. The inlet passages 81 and 91 further communicate with the intake manifold 10 of the engine 1, through a common air pipe 11 which is fixed to the cylinder head 5.

A control valve 12 is held between the air pipe 11 and the cylinder head 5. The control valve 12 comprises a valve body 120 having two separate channels 121 and 122, which connect the air pipe 11 with the air passages 81 and 91 respectively. The control valve 12 further comprises a swirl controlling flap 123 which is arranged for rotating into the channel 122 between an open and a closed position.

When the swirl controlling flap 123 is in closed position, the inlet passage 91 is blocked, and accordingly the major portion of the intake air flows into the combustion chamber 30 through the inlet passage 81 and the swirl inlet port 8. When the swirl controlling flap 123 is in open position, the inlet passage 91 is open, and the major portion of the intake air flows into the combustion chamber 30 through the inlet passage 91 and the straight inlet port 9, due to the less flow resistance of the latter relative to the swirl inlet port 8.

As shown in FIG. 1, all swirl controlling flaps 123 of the single bank engine 1 are fixed on a common rotating shaft, which is called swirl shaft 13. The swirl shaft 13 is driven by an electromechanical actuator 14, for simultaneously rotating the flaps 123 between the opened and closed position.

The electromechanical actuator 14 is of a rotational kind, and thereby comprises a rotating shaft 140 which is called actuator shaft. The swirl shaft 13 is mechanically coupled to the actuator shaft 140 by means of gears 15, such that any rotation of the actuator shaft 140 corresponds to a rotation of the swirl shaft 13 and thereby of the flaps 123. The swirl shaft 13 and the gears 15 globally form the cinematic chain allowing the electromechanical actuator 14 to drive the swirl controlling flaps 123.

A position sensor 141 is embedded on the electromechanical actuator 14 for real time sensing the angular position of the actuator shaft 140. The electromechanical actuator 14 is controlled by an engine control unit 16, on the base of the signal from the position sensor 141 and the engine operating condition. Alternatively, the electromechanical actuator 14 can be provided with an embedded microprocessor based controlled (not shown), which control the rotations of the actuator shaft 140 on the base of the signal from the position sensor 141, and which is connected to the engine control unit 16, for receiving from the latter instructions about the positions to reach in response of engine operating conditions.

As a matter of fact, the engine control unit 16 detects the position of the actuator shaft 140 and when the engine is operating at predetermined conditions, such as low or medium load, commands the electromechanical actuator 14 to rotate the swirl controlling flaps 123 in closed position, and when the engine is operating at different conditions, such as high load, commands the electromechanical actuator 14 to rotate the swirl controlling flaps 123 in open position.

Figure 2:
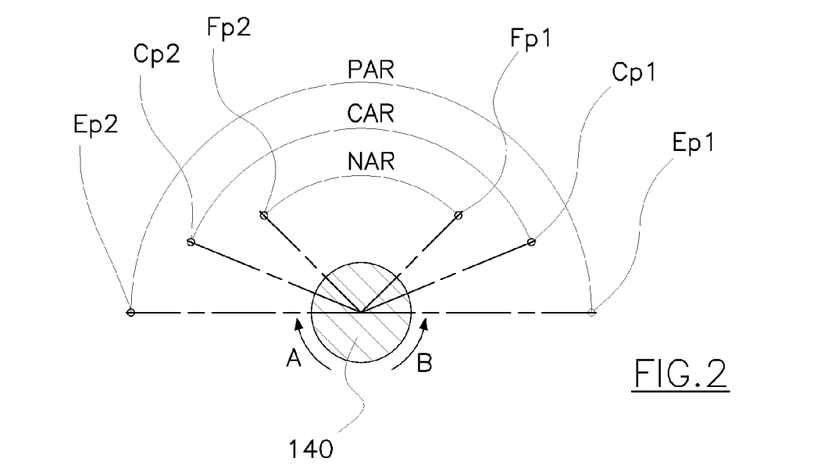
FIG. 2 is a section II-II of FIG. 1 that shows possible rotations of actuator shaft.

As shown in FIG. 2, during normal operation, the actuator shaft 140 is arranged for rotating in both senses between a first and a second final position, FP1 and FP2, which correspond to the swirl flaps open and closed positions respectively. Such final positions FP1 and FP2 defines the "nominal angular range" NAR of the actuator shaft 140. In the present example, the nominal angular range NAR is about 90°.

For sake of clarity, the rotations of the actuator shaft 140 towards the first final position FP1 are indicated with arrow A, and are hereinafter called rotations in "forward sense". The opposite rotations of the actuator shaft 140 towards the second final position FP2 are indicated with arrow B, and are hereinafter called rotations in "backward sense".

Conventionally, the electromechanical actuator 14 comprises two internal mechanical stops, which are schematically illustrated and labeled as 142 and 143 in FIG. 1. The internal mechanical stop 142 directly acts on the actuator shaft 140 for mechanically limiting the rotations of the actuator shaft 140 in forward sense A at a first extreme position, which is indicated with EP1 in FIG. 2. The internal mechanical stop 143 directly acts on the actuator shaft 140 for mechanically limiting the rotations of the actuator shaft 140 in backward sense B at a second extreme position, which is indicated with EP2 in FIG. 2. Such extreme positions EP1 and EP2 define the "potential angular range" PAG of the actuator shaft 140.

According to an embodiment of the invention, the internal mechanical stop 142 shall allow the actuator shaft 140 to rotate in forward sense A beyond the first final position FP1. In other words, the first extreme position EP1 defined by the internal mechanical stop 142 is beyond the first final position FP1 relative to the forward sense of rotation A.

Similar to that, the internal mechanical stop 143 shall allow the actuator shaft 140 to rotate in backward sense B beyond the second final position FP2. In other words, the second extreme position EP2 defined by the internal mechanical stop 143 is beyond the second final position FP2 relative to backward sense of rotation B. Therefore, the nominal angular range NAR of the actuator shaft 140 shall be a subset of the potential angular range PAR defined by the internal mechanical stops 142 and 143. In the present example, the potential angular range PAG is about 180°. The internal mechanical stops 142 and 143 are per se known and are not described in further details.

As shown in FIG. 1, the invention provides two external mechanical stops 17 and 18, which are associated to the cinematic chain connecting the actuator shaft 140 to swirl controlling flaps 123. The mechanical stop 18 directly acts on the swirl shaft 13 for thereby indirectly limiting the rotation of the actuator shaft 140 in forward sense A at a first checking position, indicated with CP1 in FIG. 2. Similar to that, the mechanical stop 17 directly acts on the swirl shaft 13 for thereby indirectly limiting the rotation of the actuator shaft 140 in backward sense B to a second checking position, indicated with CP2 in FIG. 2. Such checking positions CP1 and CP2 defines the "control angular range" CAR of the actuator shaft 140.

According to an embodiment of the invention, the external mechanical stop 18 shall allow the actuator shaft 140 to rotate in forward direction A up to or beyond the first final position FP1, but shall stop the actuator shaft 140 before it reaches the first extreme position EP1 defined by the internal mechanical stop 142. Similar to that, the external mechanical stop 17 shall allow the actuator shaft 140 to rotate in backward direction B up to or beyond the second final position FP2, but shall stop the actuator shaft 140 before it reaches the second extreme EP2 position defined by the internal mechanical stop 143. As a matter of fact, the first checking position CP1 shall be interposed between the first final position FP1 and the first extreme position EP1, and the second checking position CP2 shall be interposed between the second final position FP2 and the second extreme position EP2. Alternatively, the first checking position CP1 can coincide with the first final position FP1 and/or the second checking position CP2 can coincide with the second final position FP2. Therefore, the control angular range CAR shall be a subset of the potential angular range PAR, and shall be equal or comprise the nominal angular range NAR.

Figure 3:
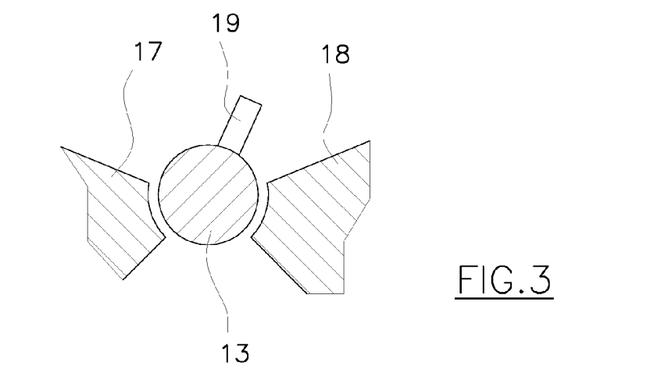
FIG. 3 in section III-III of FIG. 1.

As shown in FIG. 3, the external mechanical stops 17 and 18 can be realized by two protruding elements integral with the intake manifold 10, and one protruding element 19 integral with the swirl shaft 13, which is arranged for contacting the protruding element 17 in consequence of a rotation of the actuator shaft 140 in forward sense, and for contacting the protruding element 18 in consequence of a rotation of the actuator shaft 140 in backward sense.

For verifying the integrity of the cinematic chain connecting the actuator shaft 140 to the swirl controlling flaps 123, the embodiments of the invention provide to implement in the engine control unit 16 the diagnosis routine which is disclosed hereinafter. The engine control unit 16 commands the electromechanical actuator 14 for rotating the actuator shaft 140 in forward sense A towards the first extreme position EP1 defined by the internal mechanical stop 142.

Through the position sensor 141 embedded in the electromechanical actuator 14, the engine control unit 16 senses the angular position of the actuator shaft 140 when it stops. If the angular position of the actuator shaft 140 corresponds to the first checking position CP1 defined by the external mechanical stop 18, then the cinematic chain connecting the actuator shaft 140 to the swirl flaps 123 is integral and properly working On the contrary, if the angular position of the actuator shaft 140 actually corresponds to the first extreme position EP1 defined by the internal mechanical stop 142, than the cinematic chain is broken and a failure signal can be produced by the engine control unit 16. This control could be sufficient for verifying the cinematic chain integrity but, for a better verification, the diagnosis routine preferably provides to repeat the control also in the opposite sense of rotation.

Therefore, the engine control unit 16 commands the electromechanical actuator 14 for rotating the actuator shaft 140 in backward sense B towards the second extreme position EP2 defined by the internal mechanical stop 143. Through the position sensor 141 embedded in the electromechanical actuator 14, the engine control unit 16 senses the angular position of the actuator shaft 140 when it stops. If the angular position of the actuator shaft 140 corresponds to the second checking position CP2 defined by the external mechanical stop 17, than the cinematic chain connecting the actuator shaft 140 to the swirl controlling flaps 123 is integral and properly working. On the contrary, if the angular position of the actuator shaft 140 actually corresponds to the second extreme position defined by the internal mechanical stop 142, than the cinematic chain is broken and a failure signal can be produced by the engine control unit 16.

Figure 6:
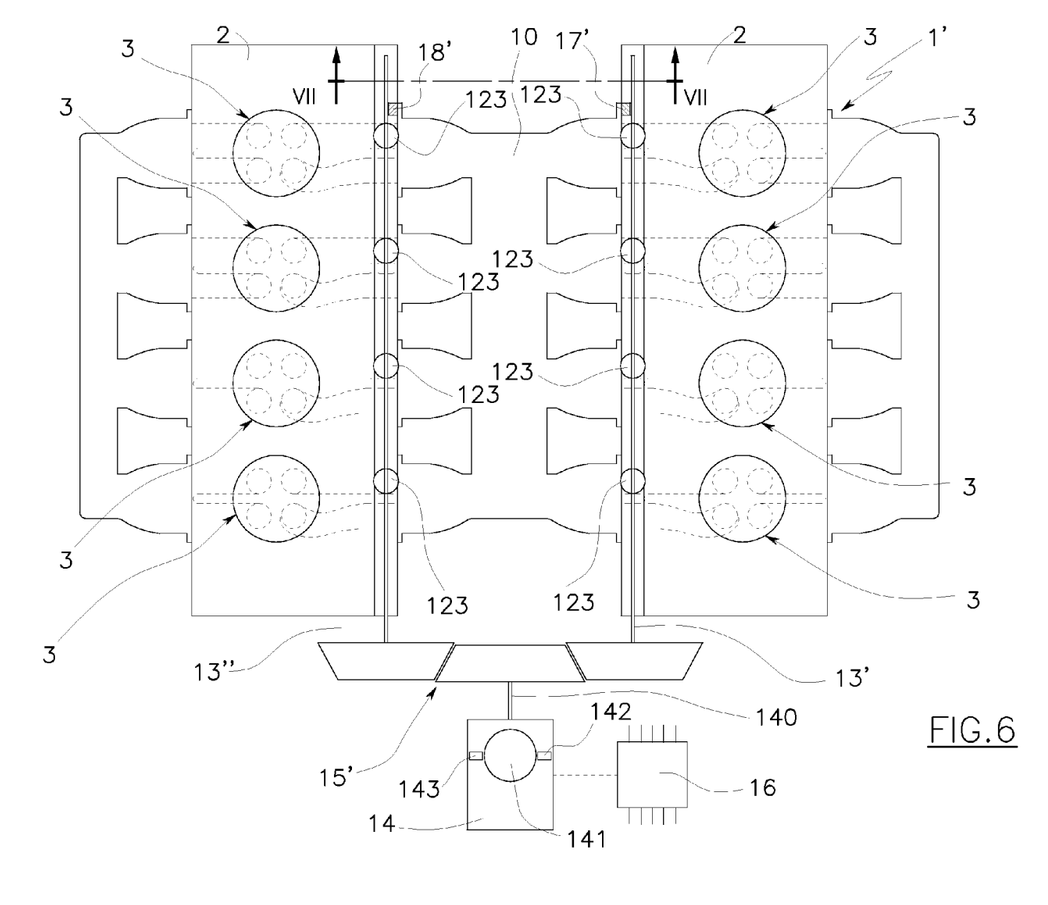
FIG. 6 is a schematic view of a two bank engine equipped with an air induction system according to an embodiment of the present invention.

FIG. 6 schematically illustrates a two bank Diesel engine 1' (for example e V engine). As a matter of fact, the engine 1' comprises two separate cylinder bank 2. Each cylinder bank 2 has a respective plurality of cylinder bores 3 therein, such that the cylinder bores 3 are globally aligned in two separate planes. Each cylinder bore 3 is substantially identical to that shown in FIG. 3 and FIG. 4. As a matter of fact, each cylinder bore 3 is provided with a respective reciprocating piston 4, and is closed on top by a cylinder head 5 which defines a combustion chamber 30 above the piston 4.

The combustion chamber 30 is provided with a control valve 12 which is held between the respective air pipe 11 of intake manifold 10 and the cylinder head 5. Therefore, the two banks engine 1' globally comprises two separate groups of swirl controlling flaps 123, which are associated to a respective engine bank 2. The swirl controlling flaps 123 of each group are fixed on a common rotating swirl shaft, which is labeled 13' and 13" respectively. The swirl shafts 13' and 13" are driven by a common electromechanical actuator 14, which is suitable for simultaneously rotating all the swirl controlling flaps 123 between the open and closed position.

The electromechanical actuator 14 is identical to that previously disclosed for the single bank engine 1. The swirl shafts 13' and 13" are mechanically coupled to the actuator shaft 140 by means of gears 15', such that any rotation of the actuator shaft 140 corresponds to a simultaneous rotation of both swirl shafts 13' and 13", and thereby of the swirl controlling flaps 123. The swirl shaft 13' and 13" and the gears 15' form the cinematic chain allowing the electromechanical actuator 14 to drive the swirl controlling flaps 123.

As previously disclosed, the electromechanical actuator 14 comprises the embedded position sensor 141 for real time sensing the angular position of the actuator shaft 140. The electromechanical actuator 14 is controlled by the engine control unit 16, on the base of the signal from the position sensor 141 and the engine operating condition. Also in this case, the electromechanical actuator 14 can alternatively be provided with an embedded microprocessor based controlled, which control the rotations of the actuator shaft 140 and which is connected to the engine control unit 16.

During normal operation, the actuator shaft 140 is commanded for rotating in both senses between the first and a second final position FP1 and FP2, which respectively correspond to the swirl controlling flaps 123 open and closed positions. The electromechanical actuator 14 further comprises the two internal mechanical stops 142 and 143, which directly acts on the actuator shaft 140 for mechanically limiting the rotation of the latter between the first and second extreme positions EP1 and EP2. The setting of the extreme positions EP1 and EP2 relative to the final positions FP1 and FP2 is identical to that previously described for the single bank engine 1.

Two external mechanical stops 17' and 18' are provided in association with the cinematic chain connecting the actuator shaft 140 to the swirl flaps 123. In this embodiment, the external mechanical stop 17' directly acts on the swirl shaft 13' for thereby indirectly limiting the rotation of the actuator shaft 140 in forward sense A at the first checking position CP1. The external mechanical stop 18' directly acts on the swirl shaft 13" for thereby indirectly limiting the rotation of the actuator shaft 140 in backward sense B at the second checking position CP2. The setting of the checking positions CP1 and CP2 relative to the final positions FP1 and FP2 and extreme positions EP1 and EP2 is identical to that previously described for the single bank engine 1.

Figure 7:
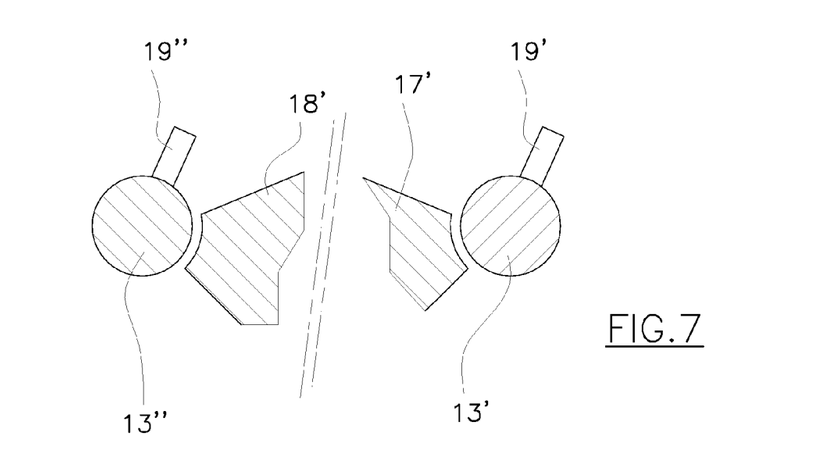
FIG. 7 is section VII-VII of FIG. 6.

As shown in FIG. 7, the external mechanical stops 18' can be realized by a single protruding element integral with the intake manifold 10, and a protruding element 19" integral with the respective swirl shaft 13", which is arranged for contacting the protruding element 18' in consequence of a rotation of the actuator shaft 140 in the backward sense.

Similar to that, the external mechanical stops 17' can be provided by a single protruding element integral with the intake manifold 10, and a protruding element 19' integral with the respective swirl shaft 13', which is arranged for contacting the protruding element 17' in consequence of a rotation of the actuator shaft 140 in the forward sense.

During the diagnosis routine, the engine control unit 16 commands the electromechanical actuator 14 for rotating the actuator shaft 140 in the forward sense A towards the first extreme position EP1 defined by the internal mechanical stop 142. Through the position sensor 141 embedded in the electromechanical actuator 14, the engine control unit 16 senses the angular position of the actuator shaft 140 when it stops.

If the angular position of the actuator shaft 140 corresponds to the first checking position CP1 defined by the external mechanical stop 17', than the cinematic chain connecting the actuator shaft 140 to the swirl controlling flaps 123 of the swift shaft 13' is integral and properly working On the contrary, if the angular position of the actuator shaft 140 actually corresponds to the first extreme position EP1 defined by the internal mechanical stop 142, than the cinematic chain is broken and a failure signal can be produced by the engine control unit 16. The diagnosis routine further provides to repeat the control check also in the opposite sense of rotation.

The engine control unit 16 commands the electromechanical actuator 14 for rotating the actuator shaft 140 in the backward sense B towards the second extreme position EP2 defined by the internal mechanical stop 143. Through the position sensor 141 embedded in the electromechanical actuator 14, the engine control unit 16 senses the angular position of the actuator shaft 140 when it stops. If the angular position of the actuator shaft 140 corresponds to the second checking position CP2 defined by the external mechanical stop 18', than the cinematic chain connecting the actuator shaft 140 to the swirl flaps 123 of the swirl shaft 13" is integral and properly working On the contrary, if the angular position of the actuator shaft 140 actually corresponds to the second extreme position CP2 defined by the internal mechanical stop 143, than the cinematic chain is broken and a failure signal can be produced by the engine control unit 16. Even if in the preceding embodiments the electromechanical actuator 14 is of rotational kind, the electromechanical actuator 14 could be of linear kind, such that the actuator shaft 140 is a reciprocating shaft which is mechanically coupled with the swirl shaft(s) by means of levers.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims.

What is claimed is:

1. A method for diagnosing an integrity of a swirl generating system for an internal combustion engine, the swirl generating system comprising a plurality of swirl controlling elements that are individually located in a respective air passage connecting an in-take manifold of the internal combustion engine to an intake port of an engine combustion chamber, an actuator having a movable shaft, a cinematic chain for mechanically connecting the plurality of swirl controlling elements to the movable shaft, an actuator control unit adapted to normally move the movable shaft in a first direction towards a first final position and in a second opposite direction towards a second final position, and an sensor adapted to sense a position of the movable shaft, the method comprising the steps of:
  arranging at least a first mechanical stop on the in-take manifold to directly act on a component of the cinematic chain in order to indirectly limit a movement of the movable shaft in the first direction at a first checking position that is at least coincident or beyond the first final position;
  coupling at least a second mechanical stop to the in-take manifold to directly act on one component of the cinematic chain in order to indirectly limit the movement of the movable shaft in a second direction at a second checking position that is co-incident or beyond the second final position;
  coupling at least a third mechanical stop to the actuator to directly act on the movable shaft to limit the movement of the movable shaft in the first direction at a first extreme position that is beyond the first checking position and first final position;
  coupling at least a fourth mechanical stop to the actuator to directly act on the movable shaft to limit the movement of the movable shaft in the second direction at a second extreme position that is beyond the second checking position and second final position;
  moving the movable shaft in the first direction towards the first checking position based upon a command from the actuator control unit;
  verifying with the sensor whether the movable shaft stops in the first checking position or stops in the first extreme position;
  moving the movable shaft in the second direction towards said second checking position based upon a second command from the actuator control unit; and
  verifying with the sensor whether the movable shaft stops in the second checking position or stops in the second extreme position.

2. The method according to claim 1, wherein the cinematic chain comprise a single swirl rotating shaft on which the plurality of swirl controlling elements are fixed, and the method further comprises the step of arranging the first mechanical stop to directly act on said single swirl rotating shaft.

3. The method according to claim 2, further comprising the step of arranging the second mechanical stop to directly act on said single swirl rotating shaft.

4. The method according to claim 1, wherein the cinematic chain comprise two separate swirl rotating shafts on each of which a respective group of swirl controlling elements are fixed, the method further comprising the steps of:
  arranging the first mechanical stop to directly act on one swirl shaft; and
  arranging the second mechanical stop to directly act on another swirl shaft.

5. The method according to claim 1, wherein the actuator is of a rotational actuator such that the movable shaft is a rotating shaft and the sensor senses an angular position of the rotating shaft.

6. The method according to claim 1, wherein the actuator is of a linear actuator such that the movable shaft is a reciprocating shaft and the sensor senses a linear position of the reciprocating shaft.

7. A swirl generating system for an engine of an internal combustion engine system, comprising:
  a plurality of swirl controlling elements that are individually located in an air passage connecting an in-take manifold of the engine to an intake port of an engine combustion chamber;
  an actuator comprising a movable shaft;
  a cinematic chain that mechanically connects the plurality of swirl controlling elements to the movable shaft;
  an actuator control unit that moves the movable shaft in a first direction towards a first final position and in a second opposite direction towards a second final position; and
  a sensor that senses a position of the movable shaft;
  at least a first mechanical stop coupled to the air in-take manifold that directly acts on a component of the cinematic chain in order to indirectly limit a movement of the movable shaft in the first direction at a first checking position that is coincident or beyond the first final position;
  at least a second mechanical stop coupled to the air in-take manifold that directly acts on one component of the cinematic chain in order to indirectly limit the movement of the movable shaft in a second direction at a second checking position that is coincident or beyond the second final position; and
  at least a third mechanical stop coupled to the actuator that directly acts on the movable shaft to limit the movement of the movable shaft in the first direction at a first extreme position that is beyond the first checking position and first final position,
  wherein the actuator control unit moves the movable shaft in the first direction towards said first checking position and verifies using the sensor whether the movable shaft stops in said first checking position or stops in said first extreme position.

8. The swirl generating system according to claim 7,
  at least a fourth mechanical stop coupled to the actuator that directly acts on the movable shaft to limit the movement of the movable shaft in the second direction at a second extreme position that is beyond the second checking position and second final position;
  wherein the actuator control unit moves the movable shaft in the second direction towards the second checking position and verifies using the sensor whether the movable shaft stops in the second checking position or is in the second extreme position.

9. The swirl generating system according to claim 8,
  wherein the cinematic chain comprises a single swirl rotating shaft on which the plurality of swirl controlling elements are fixed, and
  wherein the first mechanical stop is arranged for directly acting on said single swirl rotating shaft.

10. The swirl generating system according to claim 9, wherein the second mechanical stop is arranged to directly acting on said single swirl rotating shaft.

11. The swirl generating system according to claim 8,
  wherein the cinematic chain comprise two separate swirl rotating shafts on each of which a respective group of swirl controlling elements are fixed,
  wherein the first mechanical stop is arranged for directly acting on one swirl shaft,
  wherein the second mechanical stop being arranged for directly acting on another swirl shaft.

12. The swirl generating system according to claim 7,
  wherein the actuator is of rotational actuator such that the movable shaft is a rotating shaft, and
  wherein the sensor senses an angular position of the rotating shaft.

13. The swirl generating system according to claim 7,
wherein the actuator is a linear actuator such that the movable shaft is a reciprocating shaft, and
wherein the sensor senses a linear position of the reciprocating shaft.

\* \* \* \* \*